(12) United States Patent
Pietri et al.

(10) Patent No.: US 7,868,877 B2
(45) Date of Patent: Jan. 11, 2011

(54) TOUCH PANEL DETECTION CIRCUITRY AND METHOD OF OPERATION

(75) Inventors: Stefano Pietri, Austin, TX (US); Sheng Lin, Shenzhen (CN); Alfredo Olmos, Campinas (CO); David R. Tipple, Leander, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 743 days.

(21) Appl. No.: 11/874,400

(22) Filed: Oct. 18, 2007

(65) Prior Publication Data

US 2009/0102802 A1 Apr. 23, 2009

(51) Int. Cl.
G06F 3/045 (2006.01)

(52) U.S. Cl. ...................... 345/174; 345/173

(58) Field of Classification Search .......... 345/173, 345/174, 104; 178/18.01–18.05
See application file for complete search history.

(56) References Cited

U.S. PATENT DOCUMENTS

| | | | |
|---|---|---|---|
| 4,988,983 A | 1/1991 | Wehrer | |
| 5,415,413 A | 5/1995 | Tamaru et al. | |
| 5,508,700 A | 4/1996 | Taylor et al. | |
| 5,796,355 A | 8/1998 | Smigelski | |
| 5,890,799 A | 4/1999 | Yiu et al. | |
| 6,816,153 B2 | 11/2004 | Yamada et al. | |

FOREIGN PATENT DOCUMENTS

| | | |
|---|---|---|
| JP | 2968294 | 3/1991 |
| JP | 09-160709 | 6/1997 |
| WO | 03/052933 A2 | 6/2003 |

OTHER PUBLICATIONS

PCT/US2008/076390 International Search Report and Written Opinion.

*Primary Examiner*—Ricardo L Osorio
(74) *Attorney, Agent, or Firm*—Joanna G. Chiu; Robert L. King

(57) ABSTRACT

A touch panel detection circuit includes current limiting circuitry that has a first portion coupled between a first supply voltage terminal and a first input node and a second portion coupled between a second input node and a second supply voltage terminal. Programmable precharge circuitry connects the first input node to the first supply voltage terminal via a conductive path that is in parallel with the first portion of the current limiting circuitry and precharges the first input node to a predetermined voltage. Comparison circuitry is coupled to the programmable precharge circuitry and to the first input node. The comparison circuitry detects a change in resistance between the first input node and the second input node and provides a signal in response thereto when the comparison circuitry is enabled by the programmable precharge circuitry.

20 Claims, 4 Drawing Sheets

TOUCH PANEL DETECTION CIRCUITRY AND METHOD OF OPERATION

BACKGROUND

1. Field

This disclosure relates generally to circuitry useable with a touch panel, and more specifically, to touch panel detection circuitry.

2. Related Art

Touch panels are commonly used as input devices in a variety of applications. For example, circuitry can sense when an object like a pen applies a pressure to a touch panel, forcing the two faces of the touch panel to touch. Typically, when no pressure is applied to a touch panel, the touch panel capacitor charges up through a current limiting resistor, and when a pressure is applied, the touch panel discharges to indicate that pressure has been applied to the touch panel (i.e. to indicate a pen down event). At this point, further processing can occur to determine, for example, if subsequent pressure has been applied or the position of the applied pressure. However, as technology advances, touch panels continue to increase in size (panel area) and decrease in thickness, resulting in higher capacitance values. Since the touch panel capacitor charges up through the current limiting resistor, these higher capacitance values result in higher resistance-capacitance (RC) time constants which can detrimentally slow the charging of the touch panel capacitor resulting in false indications of applied pressure (i.e. false pen down events). These false indications reduce reliability of touch panel display systems.

One solution available today attempts to reduce the RC time constant by reducing the resistance value of the current limiting resistor described above. However, in this solution, power consumption increases during a pen down event due to the increased current flow through the smaller current limiting resistor. This can be especially problematic in hand-held or portable touch panel display systems where power consumption should be minimized in order to extend battery life. Another solution available today eliminates the current limiting resistor all together. This solution applies a periodic pulse to periodically charge the touch panel capacitor, where between charge pulses, the touch panel capacitor is left floating. However, this solution is more susceptible to noise, thus resulting in reduced reliability, and also causes increased electro-magnetic interference (EMI).

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
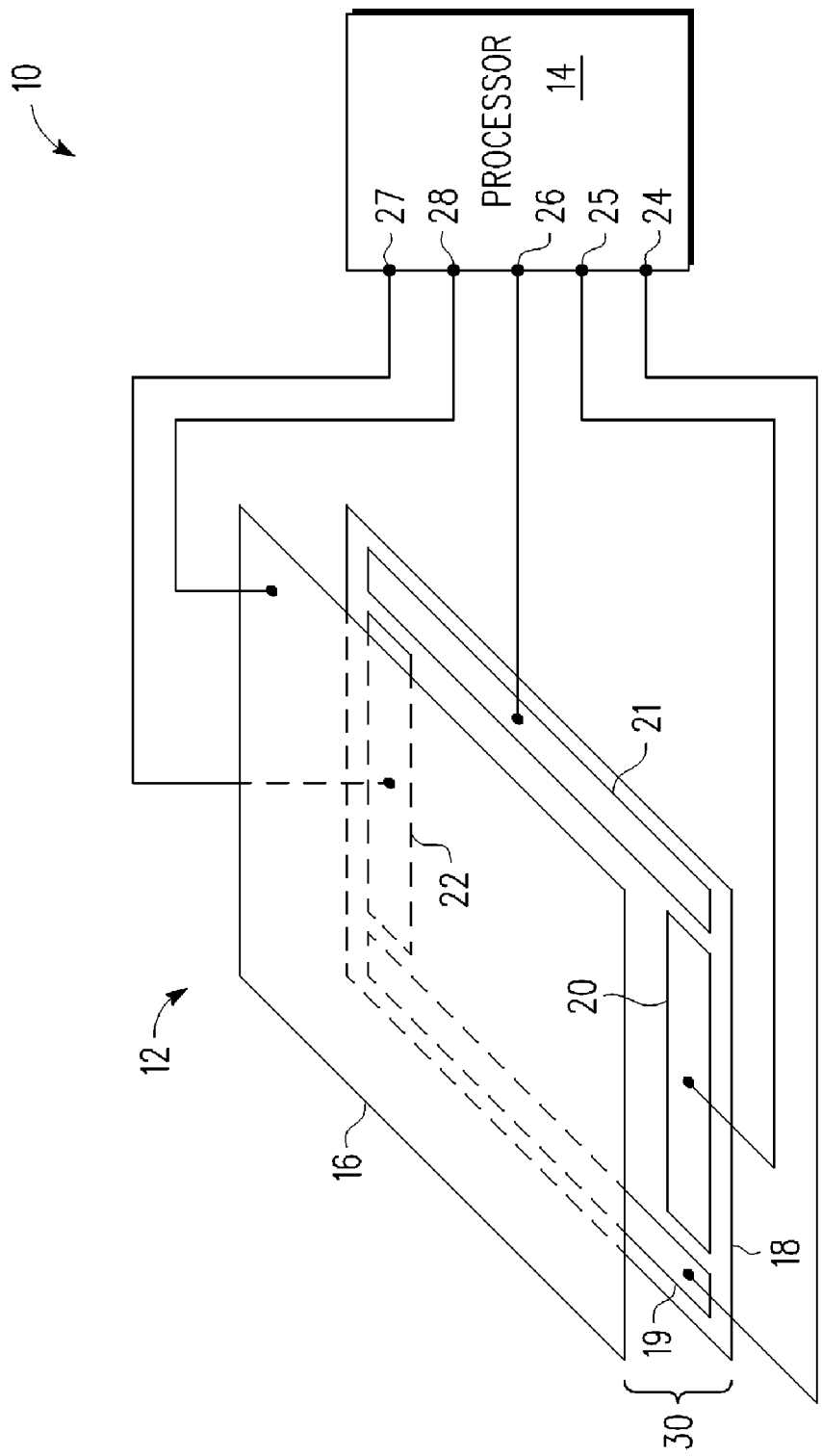
FIG. 1 illustrates, in block diagram form, a touch panel system in accordance with one embodiment of the present invention.

According to at least one embodiment of a touch panel detection circuit, precharge logic is used to precharge a touch panel capacitor by enabling a parallel path to the currently liming resistor. In this manner, a fast charge up of the touch panel capacitor can be achieved which may help increase the speed of touch panel operation, may help reduce power consumption, and may help reduce the appearance of false pen down events.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

FIG. 1 illustrates a touch panel system 10 in accordance with one embodiment of the present invention. System 10 includes a touch panel 12 and a processor 14. Touch panel 12 includes a conductive plate 16 and a resistive plate 18, where the two plates face each other, separated by a gap 30. Gap 30 may be filled with a dielectric material or may be filled with air. When no pressure (i.e. no touch stimulus) is applied to touch panel 12, touch panel 12 looks, from an electrical point of view, as a capacitor with high parallel resistance (effectively, an infinite resistance). When a pressure is applied by an object onto plate 16 (i.e. when a touch stimulus is applied), such as with a pen, plates 16 and 18 are forced to touch and the parallel resistance drops to a much lower value while the touch panel capacitance variation may be negligible. When the resistance of touch panel 12 is high, no current is flowing in the panel. However, when pressure is applied and plates 16 and 18 touch, current is allowed to flow. This change in current flow, due to the change in resistance of panel 12, allows for touch panel detection circuitry, such as within processor 14, to detect the applied pressure (i.e. to detect a pen down event). Note that although an applied pressure may be referred to as a pen down event, a pen need not be used to apply the pressure. Any object which applies pressure to touch panel 12, such as a pen or a finger, may be used to provide a touch stimulus to touch panel 12 which may result in a pen down event.

Still referring to FIG. 1, resistive plate 18 includes electrodes 19-22. Each of these electrodes can be connected to a corresponding one of terminals 24-27, respectively. Any one or all of these connections can be used by touch panel detection circuitry within processor 14 to detect a pen down event. Once a pen down event is detected, circuitry, such as within processor 14, can be used to determine the position of the applied pressure. In one embodiment, information from electrodes 19 and 21, via terminals 24 and 26, can be used to determine a position along a first axis for the applied pressure while information from electrodes 20 and 22, via terminals 25 and 27, can be used to determine position along a second axis, substantially perpendicular to the first axis, for the applied pressure. In this manner, the position of the applied pressure on touch panel 12 can be determined. Note that any conventional circuitry and methods may be used to determine the position of the applied pressure or touch stimulus on touch panel 12 in response to detecting a pen down event.

Figure 2:
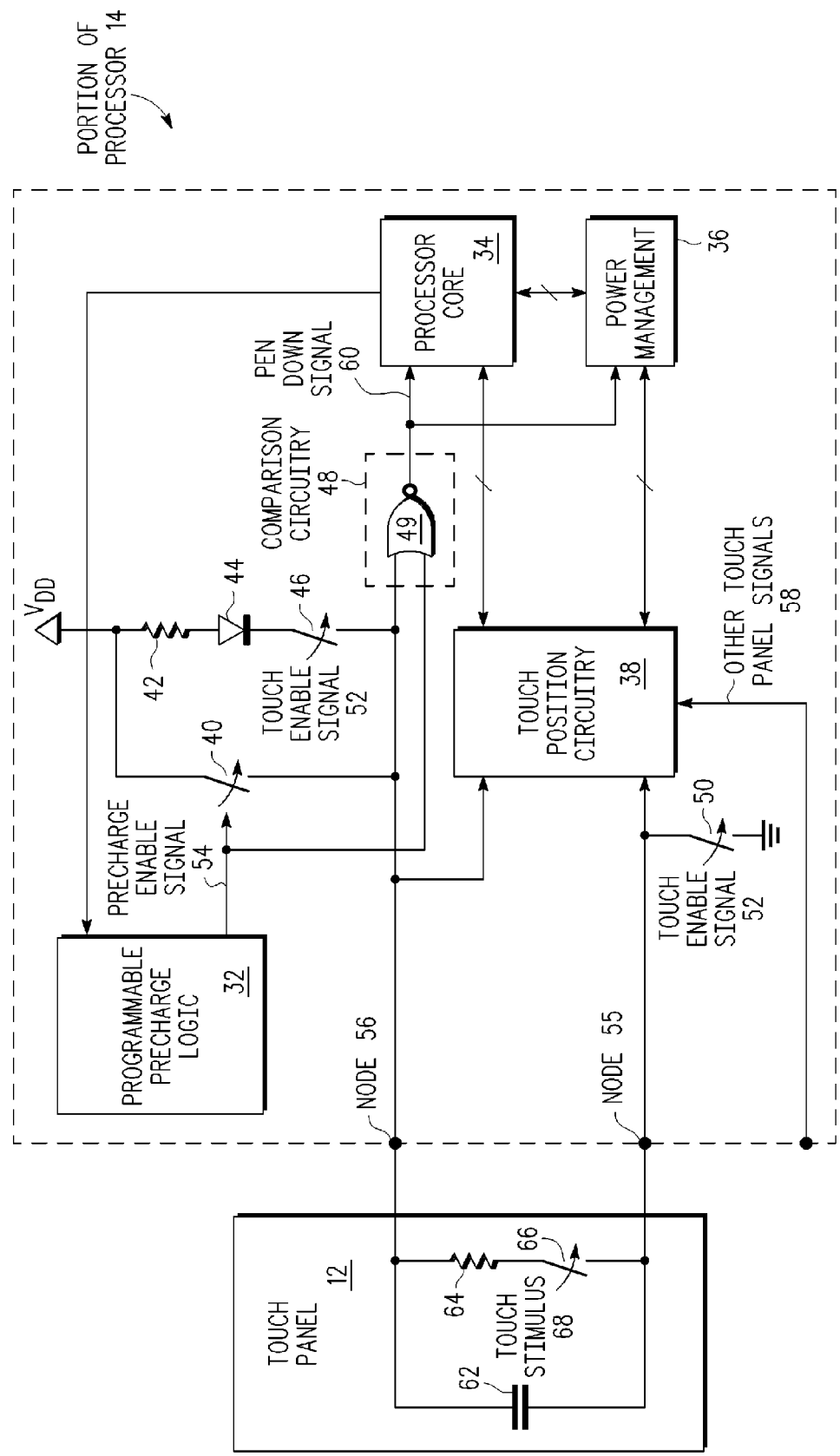
FIG. 2 illustrates, in partial block diagram and partial schematic form, a more detailed view of the touch panel system of FIG. 1.

FIG. 2 illustrates a more detailed view of system 10 of FIG. 1. In FIG. 2, touch panel 12 is represented by a capacitor 62 (which represents the touch panel capacitor formed by plates 16 and 18) and a parallel resistance 64. Note that when no touch stimulus 68 (i.e. when no pressure is applied to touch panel 12), the circuit path in parallel with capacitor 62 has a near infinite resistance. However, when touch stimulus 68 is applied (i.e. when a pressure is applied to touch panel 12), switch 66 is closed (which represents plates 16 and 18 touching), thus allowing capacitor 62 to discharge and allowing current to flow through touch panel 12. Therefore, touch panel 12 changes the resistance between nodes 56 and 55 in response to touch stimulus 68 (i.e. in response to being physically touched by an object).

FIG. 2 also illustrates a more detailed view of processor 14 including programmable precharge logic 32, a resistor 42, a diode 44, switches 40, 46, and 50, touch position circuitry 38, comparison circuitry 48 (which may, for example, include a logic gate, such as NOR gate 49 in the illustrated embodiment), a processor core 34, a power management unit 36, an input node 55, an input node 56, a first supply voltage terminal (e.g. VDD), and a second supply voltage terminal (e.g. VSS). Note that input node 56 may also be referred to as a precharge node. Processor 14 may be formed on a single integrated circuit or may be formed on a plurality of integrated circuits coupled with each other. Also, note that nodes 56 and 55 may correspond to terminals or pins of processor 14, and other touch panel signals 58 may also be received via processor terminals or pins. For example, precharge node 56 may correspond to any one or more of input terminals 24-27 of FIG. 1, and node 55 may correspond to input terminal 28 of FIG. 1. Processor 14 may be any type of processing system, such as, for example, a microcontroller, microprocessor, digital signal processor, a touch display detection circuit or system (which may or may not include a processor core such as processor core 34 and may or may not include a power management unit such as power management unit 36). That is, processor 14 may include different circuitry in different arrangements and may include additional circuitry to perform other functions as well. In the embodiment of FIG. 2, first terminals of capacitor 62 and resistor 64 are coupled to node 56 via a terminal or pin of processor 14, a second terminal of resistor 64 is coupled to a first current terminal of switch 66, and a second terminal of capacitor 62 and a second current terminal of switch 66 are coupled to node 55 via a terminal or pin of processor 14.

Still referring to FIG. 2, resistor 42 has a first terminal coupled to a first supply voltage terminal (which, in the illustrated embodiment, is VDD) and a second terminal coupled to an anode of diode 44. A cathode of diode 44 is coupled to a first current terminal of a switch 46. The first supply voltage terminal is also coupled to a first current terminal of switch 40, and a second current terminal of switch 40 is coupled to node 56. Node 56 is also coupled to a second current terminal of switch 46 and to a first input of comparison circuitry 48 (e.g., to a first input of NOR gate 49, in the illustrated embodiment). Processor core 34 is coupled to programmable precharge logic 32, touch position circuitry 38, and power management unit 36. Processor core 34 and power management unit 36 each receive pen down signal 60, which is provided as an output by comparison circuitry 48 (e.g. which corresponds to the output of NOR gate 49 in the illustrated embodiment). Programmable precharge logic 32 provides precharge enable signal 54 to a control terminal of switch 40 and to a second input of comparison circuitry 48 (e.g., to a second input of NOR gate 49 in the illustrated embodiment). Touch position circuitry 38 is coupled to nodes 56 and 55, and receives other touch panel signals 58. A first current terminal of switch 50 is coupled to node 55, and a second current electrode of switch 50 is coupled to a second supply voltage terminal (which, in the illustrated embodiment, is ground or VSS). Touch enable signal 52 is provided to the control terminals of switches 46 and 50. Touch enable signal 52, in one embodiment, is provided by processor core 34.

In one embodiment, resistor 42, diode 44, and switches 46 and 50 form current limiting circuitry (also referred to as a current limiter). In one embodiment, resistor 42, diode 44, and switch 46, all coupled between a first supply voltage terminal (e.g. VDD) and node 56, form a first portion of the current limiting circuitry, and switch 50 coupled between node 55 and a second supply voltage terminal (e.g. ground or VSS) form a second portion of the current limiting circuitry.

In one embodiment, each of switches 40, 46, and 50 may be implemented as a transistor. Alternatively, other types of circuitry may be used to implement the switching functions of these switches. Note also that the first and second current terminals of each switch may be referred to as the first and second terminals, respectively. Also, in the illustrated embodiment, precharge enable signal 54 and pen down signal 60 are implemented as positive logic signals.

Figure 4:
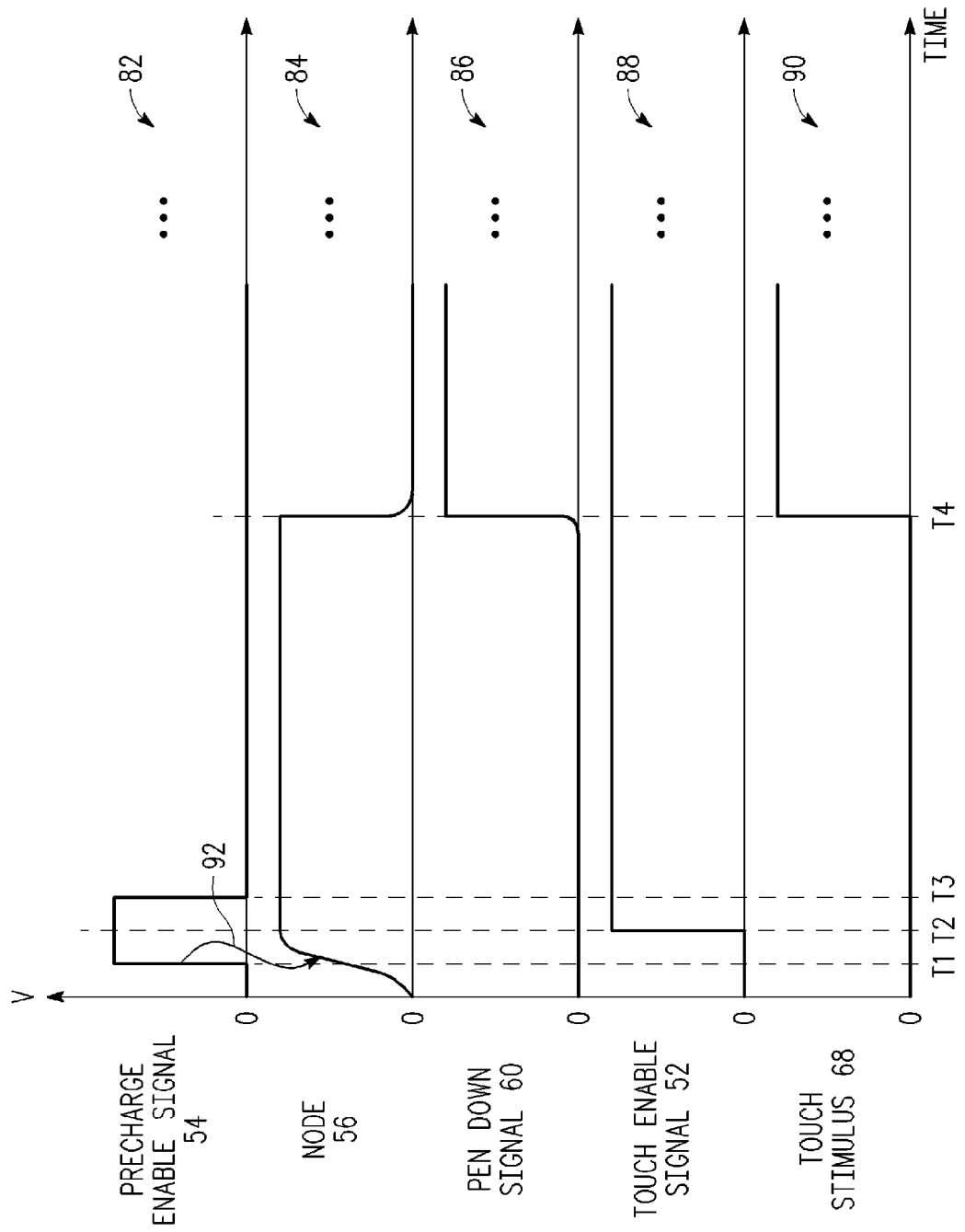
FIG. 4 illustrates a plurality of touch panel detection circuitry waveforms in accordance with one embodiment of the present invention.

In operation, when no touch stimulus is present on touch panel 12, i.e. when switch 66 is open, node 56 is precharged to approximately VDD. This is performed by using precharge enable signal 54 to enable (i.e. close) switch 40 so that a low resistance current path exists between Vdd and node 56. In one embodiment, switch 40 is implemented with a transistor. Therefore, in one embodiment, programmable precharge logic 32 connects node 56 to VDD via a conductive path (e.g. via switch 40) that is in parallel with a first portion of the current limiting circuitry (e.g. resistor 42, diode 44, and switch 46) for precharging node 56. Programmable precharge logic 32 asserts precharge enable signal 54 for a time sufficient to allow precharge node 56 to charge up to VDD through pull-up switch 40. Therefore, if a smaller device is used for switch 40, precharge enable signal 54 may need to enable switch 40 for a longer period of time as compared to when a larger device is used for switch 40. Referring to waveform 82 of FIG. 4, note that precharge enable signal 54 is asserted from time T1 to time T3. This results in node 56 charging to VDD, as illustrated by arrow 92 and waveform 84 of FIG. 4. At some time prior to completion of the precharge of node 56, touch enable signal 52 is asserted by, for example, control circuitry within processor core 34, to enable (i.e. close) switches 46 and 50. Referring to waveform 88, note that touch enable signal 52 is enabled at time T2 which is between time T1 and time T3.

Also, while precharge enable signal 54 is asserted, comparison circuitry 48 is disabled. That is, in the illustrated embodiment where NOR gate 49 is used to implement comparison circuitry 48, precharge enable signal 54, when asserted and provided as the second input to NOR gate 49, masks the first input of NOR gate 49, which is coupled to node 56. Therefore, pen down signal 60 remains deasserted (at a logic level low in the current example) while precharge enable signal 54 remains asserted. In this manner, pen down signal 60 cannot be inadvertently asserted to indicate a pen down event until precharge enable signal 54 is deasserted (i.e., until processor 14 is ready to detect a touch stimulus on touch panel 12.)

After precharging, processor 14 has been prepared and is therefore ready to detect a touch stimulus. Since, at time T3, precharge enable signal 54 is deasserted by programmable precharge logic 32, comparison circuitry 48 is enabled to assert or deassert pen down signal 60. That is, when the second input of NOR gate 49 is a logic level low, it no longer masks the first input of NOR gate 49, and pen down signal 60 will now be affected by the value of the first input of NOR gate 49, which is provided by node 56. While node 56 is precharged and no touch stimulus has been applied to touch panel 12, node 56 remains at a logic level one and therefore, pen down signal 60 remains deasserted (i.e. at a logic level low, in this example), indicating that no pen down event is occurring (i.e. indicating no touch stimulus on touch panel 12). Furthermore, in one embodiment, a portion of the current limiting circuitry (such as, for example, resistor 42) may help in sustaining the charge at precharged node 56.

When touch stimulus 68 is applied and closes switch 66, current is allowed to flow through touch panel 12, via the path provided by the current limiting circuitry. In the illustrated embodiment, when touch stimulus 68 is applied, capacitor 62 discharges through resistor 64 and closed switch 66 (which, as described above, represents plates 16 and 18 touching). Also, when touch stimulus 68 is applied, a current path is provided from the VDD supply voltage terminal through resistor 42, diode 44, switch 46, through nodes 56 and 55, through switch 50 to the VSS supply voltage terminal. In one embodiment, resistor 42 of the current limiting circuitry limits current flow when touch stimulus 68 is applied. In response to touch stimulus 68 closing switch 66, node 56 gets discharged and eventually causes pen down signal 60, via NOR gate 49, to be asserted (i.e. to become a logic level one in this example) to indicate a pen down event. Referring to waveform 90 in FIG. 4, note that touch stimulus 68 is provided at time T4. Thus, at time T4, node 56 discharges to a logic level low (see waveform 84 of FIG. 4), which in turn, causes assertion of pen down signal 60 (see waveform 86 of FIG. 4). Therefore, note that comparison circuitry 48, when enabled by programmable precharge logic 32, detects a change in resistance between nodes 56 and 55 (which is caused, for example, by a touch stimulus 68 being applied) and provides pen down signal 60 in response thereto. Furthermore, in one embodiment, programmable precharge logic 32 selectively enables and disables comparison circuitry from detecting change in resistance between nodes 56 and 55.

Once a pen down event has been detected via assertion of pen down signal 60, processor core 34 can process the pen down event. In one embodiment, assertion of pen down signal 60 generates an interrupt, and an interrupt handling routine of processor core 34 services the interrupt. Any further processing in response to the pen down event can then occur. For example, in some cases, upon detection of a pen down event, processor core 34 may enable touch position circuitry 38 (which may be implemented using any known circuitry). Touch position circuitry 38 may then determine, using some or all of the information provided by electrodes 19-22 and electrode 18, a position of the touch stimulus which triggered the pen down event. In another case, upon detection of a pen down event, processor core 34 may enable another precharge cycle (where precharge enable signal 54 would be asserted to close switch 40 and thus allow node 56 to precharge) to prepare for the detection of another pen down event to determine, for example, if a "double-click" operation is being performed. Therefore, control circuitry within processor core 34 can enable programmable precharge logic 32 and afterwards, appropriately assert touch enable signal 52, to prepare touch panel 12 for a subsequent touch stimulus detection. This preparation of precharging node 56 as described above can be performed as needed, such as prior to each time processor 14 expects an input (expects a touch stimulus to be applied to touch panel 12) or after processing of a previous pen down event has been completed. Also, the power management of all or a portion of processor 14 or system 10 may be performed by power management unit 36 in response to a pen down event indicated by pen down signal 60.

In one embodiment, the length of time for which precharge enable signal 54 is asserted is programmable. That is, programmable precharge logic 32 can assert precharge enable signal 54 for a period of time which can vary depending on a programmed or selected value. For example, the duration of the assertion of precharge enable signal 54 can be selected and programmed based on the size of touch panel a user wants to connect to processor 14. In one embodiment, processor core 34 programs and selectively varies the amount of time that precharging of node 56 occurs. The programmability aspect may be implemented in a variety of ways, such as through a register, select circuitry, etc. Alternatively, a fixed amount of time for the precharge of node 56 may be used.

Also, in an alternate embodiment, note that comparison circuitry 48 can be implemented in a variety of different ways. For example, in one embodiment, a comparator may be used, where node 56 is coupled to a first input of the comparator and a reference compare voltage is provided to a second input of the comparator and where precharge enable signal 54 can be provided to an enable input of the comparator, so that the comparator is only enabled when node 56 is not being precharged via switch 40. In this manner, a pen down event will be indicated by pen down signal 60 based on when the voltage at node 56 falls below the reference voltage. Alternatively, other circuits may be used to implement comparison circuitry 48.

Note that the current limiting circuitry (including, e.g., resistor 42, diode 44, switch 46, and switch 50) operates to limit current during occurrence of a pen down event. For example, resistor 42 is a relatively large resistor (for example, resistor 42 may have a resistance near or about 100 k-ohm) which limits current flow when switch 66 is closed. (For comparison, the resistance of switch 40, when enabled, may be in a range of approximately 1 to 1000 ohms.) In this manner, power consumption during a pen down event can be minimized. In alternate embodiments, note that the current limiting circuitry can be implemented differently. For example, diode 44 and resistor 42 can be swapped, diode 44 may not be present, or diode 44 and resistor 42 can be located adjacent to switch 50 and coupled between node 55 and ground. Alternatively, circuitry within the current limiting circuitry can be placed such that the VDD and ground supply voltage terminals are swapped.

Without the alternate current path created via pull-up switch 40 for charging node 56, node 56 would have to be more slowly charged up via pull-up switch 46 and resistor 42. The charge up time of node 56 in this case would be directly dependent on the RC time constant provided by capacitor 62 and resistor 42. It may be desirable to use a relatively large resistance for resistor 42 in order to minimize power consumption, and as larger and larger touch panels are available, the capacitance value of capacitor 62 may also be larger. These factors result in increasingly large time constants, which results in longer and longer times required to fully charge up node 56. This may result in slower operation and may increase the occurrence of false pen down events.

Figure 3:
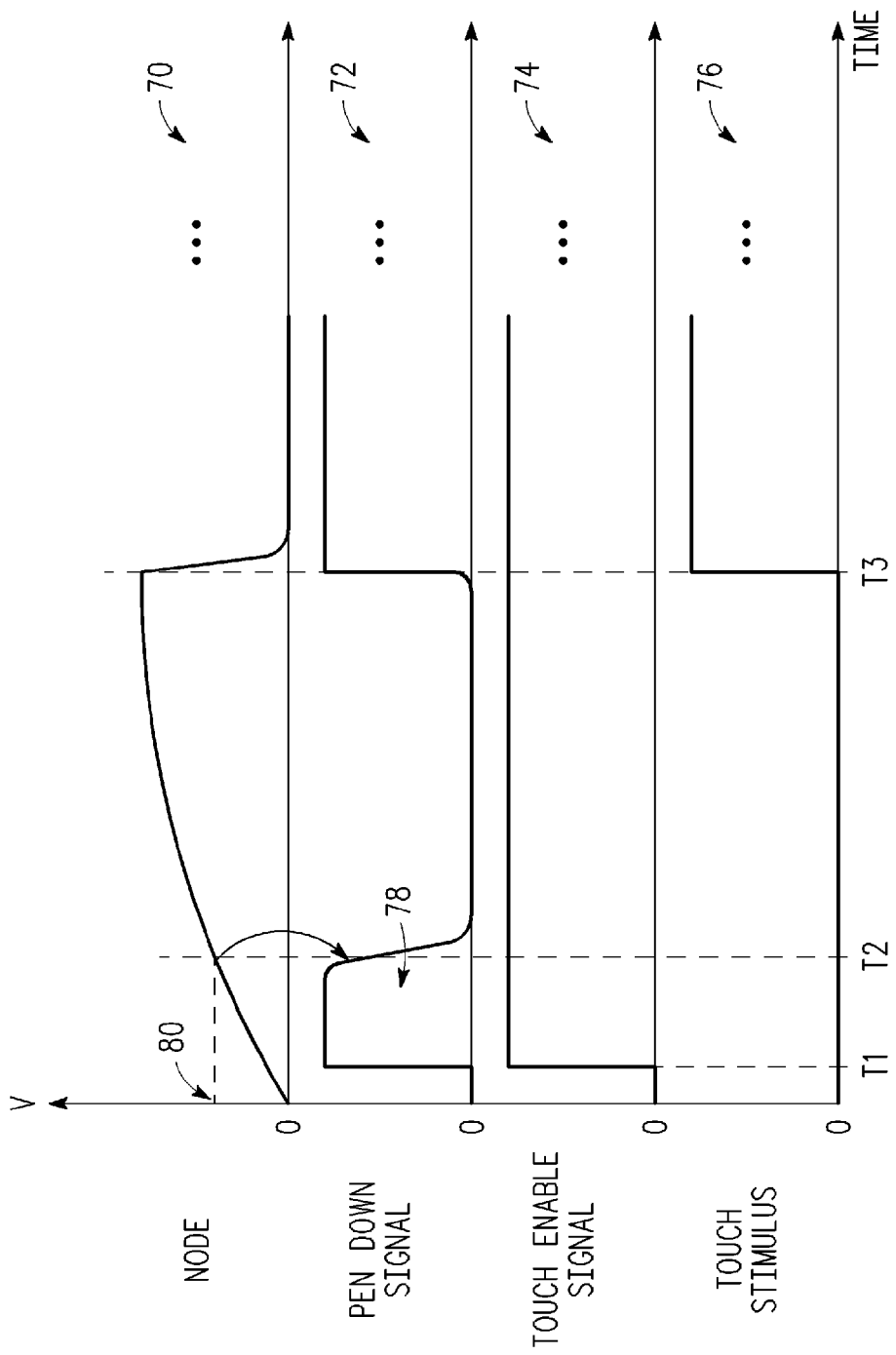
FIG. 3 illustrates a plurality of touch panel detection circuitry waveforms in accordance with a prior art touch panel circuit.

For example, FIG. 3 illustrates waveforms in a prior art touch panel system in which the charging of the touch panel capacitance is performed via the current limiting circuitry, such as a pull-up resistor similar to resistor 42. As illustrated in waveform 70 of FIG. 3, the touch panel does not fully precharge until time T3. However, during that time, circuitry which is used to detect a pen event (such as an inverter coupled to the precharge node) will falsely indicate a pen down event, as illustrated by waveform 72 in which the pen down signal is asserted between time T1 and T2, thus representing a false pen down event 78 because no actual touch stimulus is applied to the touch panel between time T1 and T2, as illustrated by waveform 76. Therefore, in the prior art systems, once the touch enable signal is asserted (as seen in waveform 72 of FIG. 3), pen down signal may also be asserted due the slow charging of the touch panel, and not until the touch panel reaches a voltage level 80 does the pen down signal become properly deasserted and ready to indicate a true pen down event. Note that a true pen down event does not occur until T3 when a touch stimulus is applied and the pen down signal therefore becomes asserted (see waveforms 72 and 76). Therefore, note that the slower the charging of the touch panel, the more problematic and unreliable operation becomes. Furthermore, in many cases, it is unknown what size the touch panel to be used by the customer will be, thus making it difficult to appropriately design the current limiting circuitry to result in an appropriate RC time constant for precharging. Also, in reducing the size of the pull-up resistor of the current limiting circuitry to allow for a faster charge up time, power consumption is increased, which is detrimental to many applications.

Therefore, it can be appreciated how the use of a precharge enable signal 54 in combination with a switch 40 to provide an alternate precharge current path parallel to at least a portion of the current limiting circuitry, may allow for improved operation. Furthermore, in one embodiment, through the use of programmable precharge logic 32, the duration of precharge enable signal 54 (and thus the duration of how long the parallel current path for precharging is enabled) can be programmed to a particular value based on the needs of the system. For example, this value can be programmed based on the size of switch 40 or based on the size of touch panel 12. Also, in one embodiment, the use of an alternate precharge current path may allow for a faster charge up time as well as a more reliable system that is less prone to false detections of pen down events. Furthermore, in one embodiment, pull-up resistor 42 can be designed to be large enough to minimize power consumption without affecting the charge up time of node 56.

In one embodiment, a touch panel detection circuit includes current limiting circuitry including a first portion coupled between a first supply voltage terminal and a first input node and including a second portion coupled between a second input node and a second supply voltage terminal, programmable precharge circuitry for connecting the first input node to the first supply voltage terminal via a conductive path that is in parallel with the first portion of the current limiting circuitry and for precharging the first input node to a predetermined voltage, and comparison circuitry coupled to the programmable precharge circuitry and to the first input node, the comparison circuitry detecting a change in resistance between the first input node and the second input node and providing a signal in response thereto when the comparison circuitry is enabled by the programmable precharge circuitry.

In a further embodiment, the first input node and the second input node further include two separate input terminals of an integrated circuit. In yet a further embodiment, the touch panel detection circuit further includes a touch panel including a first terminal coupled to the first input node and including a second terminal coupled to the second input node, the touch panel changing resistance between the first input node and the second input node in response to being physically touched by an object.

In another further embodiment, the comparison circuitry further includes a logic gate having a first logic gate input connected to the first input node, a second logic gate input connected to the programmable precharge circuitry and an output for providing the signal when detecting change in resistance between the first input node and the second input node.

In another further embodiment, the current limiting circuitry further includes a resistor comprising a first terminal coupled to the first supply voltage terminal and a second terminal, a first switch comprising a first terminal coupled to the second terminal of the resistor, a second terminal coupled to the first input node, and a control terminal for receiving an enable signal, and a second switch including a first terminal coupled to the second input node, a second terminal coupled to the second supply voltage terminal, and a control terminal for receiving the enable signal.

In another further embodiment, the current limiting circuitry further includes a resistor including a first terminal connected to the first supply voltage terminal and a second terminal, a diode including an anode connected to the second terminal of the resistor and a cathode, a first switch including a first terminal connected to the cathode of the diode, a second terminal connected to the first input node, and a control terminal for receiving an enable signal, and a second switch including a first terminal connected to the second input node, a second terminal connected to the second supply voltage terminal, and a control terminal for receiving the enable signal.

In another further embodiment, the programmable precharge circuitry selectively enables and disables the comparison circuitry from detecting change in resistance between the first input node and the second input node.

In another further embodiment, further including a processor core coupled to the programmable precharge circuitry and the comparison circuitry for programming and selectively varying an amount of time that precharging of the first input node occurs.

In another embodiment, a method includes providing a circuit having first and second nodes, coupling comparison circuitry to the first node for detecting a change in resistance between the first node and the second node and providing a detection output signal in response thereto, selectively precharging the first node by controlling a switch that connects a first power supply terminal to the first node via a first conductive path while disabling the comparison circuitry from providing the detection output signal, and stop precharging the first node and connecting current limiting circuitry to the first node via a second conductive path that is in parallel with the first conductive path, the current limiting circuitry sustaining charge at the first node while limiting current flow at the first node when coupled to the second node.

In a further embodiment, the method further includes implementing the current limiting circuitry with a first portion coupled between a first power supply terminal and the first node and a second portion coupled between the second node and a second power supply terminal. In yet a further embodiment, the method further includes implementing the first portion of the current limiting circuitry with a first resistor having a first terminal connected to the first power supply terminal and having a second terminal.

In another further embodiment, the method further includes coupling the first node to the second node by coupling a touch panel between the first node and the second node to establish a first resistance between the first node and the second node, changing the first resistance to a second resistance by touching the touch panel, and detecting changing the first resistance to the second resistance with the comparison circuitry.

In another further embodiment, the method further includes programming and selectively varying an amount of time that precharging of the first node occurs.

In another embodiment, a touch panel detection circuit includes a first power supply voltage terminal and a second power supply voltage terminal, a precharge node forming a first input terminal of the touch panel detection circuit for connection to a touch panel, a second input terminal of the touch panel detection circuit for connection to the touch panel, a current limiter including a first portion coupled between the precharge node and the first power supply voltage terminal and including a second portion coupled between second input terminal and the second power supply voltage terminal, precharge circuitry for connecting the first input terminal to the first supply voltage terminal via a conductive path that is in parallel with the first portion of the current limiter and for precharging the precharge node to a predetermined voltage, and comparison circuitry coupled to the precharge circuitry and to the precharge node, the comparison circuitry detecting a change in resistance between the first input terminal and the second input terminal and providing a signal in response thereto.

In a further embodiment of the another embodiment of the touch panel circuitry, the precharge circuitry disables the comparison circuitry when precharging the precharging node and enables the comparison circuitry when not precharging the precharging node.

In another further embodiment of the another embodiment of the touch panel circuitry, the comparison circuitry further includes a logic gate having a first logic gate input connected to the first input terminal, a second logic gate input connected to the precharge circuitry, and an output for providing the signal when detecting change in resistance between the first input terminal and the second input terminal.

In another further embodiment of the another embodiment of the touch panel circuitry, the first portion of the current limiter further includes a resistor having a first terminal coupled to the first power supply voltage terminal, and a second terminal, and a switch having a first terminal coupled to the second terminal of the resistor, a second terminal coupled to the first input terminal, and a control terminal for receiving an enable signal that controls when the comparison circuitry is able to detect a change in resistance between the first input terminal and the second input terminal.

In another further embodiment of the another embodiment of the touch panel circuitry, the precharge circuitry is programmable for programming how long the precharge circuitry is allowed to precharge the precharge node to the predetermined voltage.

In another further embodiment of the another embodiment of the touch panel circuitry, the current limiter further includes a resistor having a first terminal connected to the first power supply voltage terminal, and a second terminal, a diode having an anode connected to the second terminal of the resistor, and a cathode, a first switch having a first terminal connected to the cathode of the diode, a second terminal connected to the first input terminal and a control terminal for receiving an enable signal that controls when the comparison circuitry is able to detect a change in resistance between the first input terminal and the second input terminal, and a second switch having a first terminal connected to the second input terminal, a second terminal connected to the second power supply voltage terminal, and a control terminal for receiving the enable signal.

In another further embodiment of the another embodiment of the touch panel circuitry, the touch panel detection circuit further includes a processor core having an input for receiving the signal from the comparison circuitry and an output coupled to the precharge circuitry, the processor core programming the precharge circuitry to control how long the precharge circuitry is allowed to precharge the precharge node to the predetermined voltage.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed. For example, if the voltage supply terminals of FIG. 2 are swapped, then pen down signal 60 may be implemented as negative logic signal rather than a positive logic signal, as described above.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIGS. 1 and 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of processor 14 are circuitry located on a single integrated circuit or within a same device. Alternatively, processor 14 may include any number of separate integrated circuits or separate devices interconnected with each other. Also for example, processor 14 or portions thereof may be soft or code representations of physical circuitry or of logical representations convertible into physical circuitry. As such, processor 14 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, comparison circuitry may be implemented in a variety of different ways, as can the current limiting circuitry. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A touch panel detection circuit comprising:
    current limiting circuitry comprising a first portion coupled between a first supply voltage terminal and a first input node and comprising a second portion coupled between a second input node and a second supply voltage terminal;
    programmable precharge circuitry for connecting the first input node to the first supply voltage terminal via a conductive path that is in parallel with the first portion of the current limiting circuitry and for precharging the first input node to a predetermined voltage; and
    comparison circuitry coupled to the programmable precharge circuitry and to the first input node, the comparison circuitry detecting a change in resistance between the first input node and the second input node and providing a signal in response thereto when the comparison circuitry is enabled by the programmable precharge circuitry.

2. The touch panel detection circuit of claim 1 wherein the first input node and the second input node further comprise two separate input terminals of an integrated circuit.

3. The touch panel detection circuit of claim 2 further comprising:
    a touch panel comprising a first terminal coupled to the first input node and comprising a second terminal coupled to the second input node, the touch panel changing resistance between the first input node and the second input node in response to being physically touched by an object.

4. The touch panel detection circuit of claim 1 wherein the comparison circuitry further comprises:
    a logic gate having a first logic gate input connected to the first input node, a second logic gate input connected to the programmable precharge circuitry and an output for providing the signal when detecting change in resistance between the first input node and the second input node.

5. The touch panel detection circuit of claim 1 wherein the current limiting circuitry further comprises:
    a resistor comprising a first terminal coupled to the first supply voltage terminal and a second terminal;
    a first switch comprising a first terminal coupled to the second terminal of the resistor, a second terminal coupled to the first input node, and a control terminal for receiving an enable signal; and
    a second switch comprising a first terminal coupled to the second input node, a second terminal coupled to the second supply voltage terminal, and a control terminal for receiving the enable signal.

6. The touch panel detection circuit of claim 1 wherein the current limiting circuitry further comprises:
    a resistor comprising a first terminal connected to the first supply voltage terminal and a second terminal;
    a diode comprising an anode connected to the second terminal of the resistor and a cathode;
    a first switch comprising a first terminal connected to the cathode of the diode, a second terminal connected to the first input node, and a control terminal for receiving an enable signal; and
    a second switch comprising a first terminal connected to the second input node, a second terminal connected to the second supply voltage terminal, and a control terminal for receiving the enable signal.

7. The touch panel detection circuit of claim 1 wherein the programmable precharge circuitry selectively enables and disables the comparison circuitry from detecting change in resistance between the first input node and the second input node.

8. The touch panel detection circuit of claim 1 further comprising:
a processor core coupled to the programmable precharge circuitry and the comparison circuitry for programming and selectively varying an amount of time that precharging of the first input node occurs.

9. A method comprising:
providing a circuit having first and second nodes;
coupling comparison circuitry to the first node for detecting a change in resistance between the first node and the second node and providing a detection output signal in response thereto;
selectively precharging the first node by controlling a switch that connects a first power supply terminal to the first node via a first conductive path while disabling the comparison circuitry from providing the detection output signal; and
stop precharging the first node and connecting current limiting circuitry to the first node via a second conductive path that is in parallel with the first conductive path, the current limiting circuitry sustaining charge at the first node while limiting current flow at the first node when coupled to the second node.

10. The method of claim 9 further comprising:
implementing the current limiting circuitry with a first portion coupled between a first power supply terminal and the first node and a second portion coupled between the second node and a second power supply terminal.

11. The method of claim 10 further comprising:
implementing the first portion of the current limiting circuitry with a first resistor having a first terminal connected to the first power supply terminal and having a second terminal.

12. The method of claim 9 further comprising:
coupling the first node to the second node by coupling a touch panel between the first node and the second node to establish a first resistance between the first node and the second node;
changing the first resistance to a second resistance by touching the touch panel; and
detecting changing the first resistance to the second resistance with the comparison circuitry.

13. The method of claim 9 further comprising:
programming and selectively varying an amount of time that precharging of the first node occurs.

14. A touch panel detection circuit comprising
a first power supply voltage terminal and a second power supply voltage terminal;
a precharge node forming a first input terminal of the touch panel detection circuit for connection to a touch panel;
a second input terminal of the touch panel detection circuit for connection to the touch panel;
a current limiter comprising a first portion coupled between the precharge node and the first power supply voltage terminal and comprising a second portion coupled between second input terminal and the second power supply voltage terminal;
precharge circuitry for connecting the first input terminal to the first supply voltage terminal via a conductive path that is in parallel with the first portion of the current limiter and for precharging the precharge node to a predetermined voltage; and
comparison circuitry coupled to the precharge circuitry and to the precharge node, the comparison circuitry detecting a change in resistance between the first input terminal and the second input terminal and providing a signal in response thereto.

15. The touch panel detection circuit of claim 14 wherein the precharge circuitry disables the comparison circuitry when precharging the precharging node and enables the comparison circuitry when not precharging the precharging node.

16. The touch panel detection circuit of claim 14 wherein the comparison circuitry further comprises:
a logic gate having a first logic gate input connected to the first input terminal, a second logic gate input connected to the precharge circuitry, and an output for providing the signal when detecting change in resistance between the first input terminal and the second input terminal.

17. The touch panel detection circuit of claim 14 wherein the first portion of the current limiter further comprises:
a resistor having a first terminal coupled to the first power supply voltage terminal, and a second terminal; and
a switch having a first terminal coupled to the second terminal of the resistor, a second terminal coupled to the first input terminal, and a control terminal for receiving an enable signal that controls when the comparison circuitry is able to detect a change in resistance between the first input terminal and the second input terminal.

18. The touch panel detection circuit of claim 14 wherein the precharge circuitry is programmable for programming how long the precharge circuitry is allowed to precharge the precharge node to the predetermined voltage.

19. The touch panel detection circuit of claim 14 wherein the current limiter further comprises:
a resistor having a first terminal connected to the first power supply voltage terminal, and a second terminal;
a diode having an anode connected to the second terminal of the resistor, and a cathode;
a first switch having a first terminal connected to the cathode of the diode, a second terminal connected to the first input terminal and a control terminal for receiving an enable signal that controls when the comparison circuitry is able to detect a change in resistance between the first input terminal and the second input terminal; and
a second switch having a first terminal connected to the second input terminal, a second terminal connected to the second power supply voltage terminal, and a control terminal for receiving the enable signal.

20. The touch panel detection circuit of claim 14 further comprising:
a processor core having an input for receiving the signal from the comparison circuitry and an output coupled to the precharge circuitry, the processor core programming the precharge circuitry to control how long the precharge circuitry is allowed to precharge the precharge node to the predetermined voltage.

* * * * *